Aug. 6, 1968   J. ROSÁN ET AL   3,395,934
FITTINGS FOR HIGH PRESSURE FLUID LINES
Filed Oct. 22, 1965   2 Sheets-Sheet 1

JOSÉ ROSÁN
MILAN NOVAKOVICH
INVENTORS.

BY
ATTORNEY

JOSÉ ROSÁN
MILAN NOVAKOVICH
INVENTORS.

BY

ATTORNEY

United States Patent Office 3,395,934
Patented Aug. 6, 1968

3,395,934
FITTINGS FOR HIGH PRESSURE
FLUID LINES
José Rosán, Rancho San Juan, San Juan Capistrano, Calif. 96275, and Milan Novakovich, 215 Apolena Ave., Balboa Island, Calif. 92662
Filed Oct. 22, 1965, Ser. No. 502,031
9 Claims. (Cl. 285—23)

ABSTRACT OF THE DISCLOSURE

This invention provides a fluid fitting which is locked against loosening due to vibration by means of a coacting serrated locking ring which is temporarily rigidly secured to the body of the fitting so as to provide an integral unit. The fluid fitting of the invention provides a positive seal by use of a beveled metal-to-metal seal and an O-ring seal in conjunction therewith. The invention further provides means for limiting the axial displacement of the lock ring to a uniform depth and a means for removing the same in the event the fitting is replaced or repaired.

---

This invention relates to fluid fittings, and particularly to an improvement in fittings for high pressure fluid lines.

In the field of fluid flow, particularly the hydraulic application field, it is necessary to utilize a plurality of fittings which may be secured to various types of equipment, and to which flexible or rigid high pressure conduits may be attached.

Such fittings may require repeated assembly and disassembly during the process of maintaining the equipment with which they are associated.

Examples of the service to which such fluid fittings are adapted may be found in the aircraft industry, where it is necessary to conduct hydraulic fluid at high pressure to a number of parts of the aircraft to operate the landing gear, the wing flaps, adjust the pitch of the propellers, and to actuate other important portions of the aircraft's equipment.

Fluid fittings and systems perform important functions in aircraft. This is particularly true in the landing gear thereof since the combined stresses resulting from the fast moving mass and the dead weight of the aircraft are very substantial when it is landing so as to cause the landing gear equipment to malfunction.

One of the defects in existing fittings has been a tendency to become loosened due to vibration. Such loosening may cause a leakage at a joint, and the failure of the fluid system at critical moments.

The present invention therefore provides a fluid fitting which cannot loosen accidentally or through vibration, and which will insure a positive seal of the fluid system at any pressure which may be encountered.

The objects of this invention thus include the provision of fluid fittings to which high pressure fluid lines may be attached.

Another object is to provide fluid line fittings to which the lines themselves may be readily secured and disassembled.

A still further object is to provide fluid fittings which may utilize conventional O-rings to assist in retaining fluid pressure.

A further object is to provide a fluid fitting having an alternative form of all metal seal to retain high fluid pressures.

Yet another object is to provide a fluid fitting having less size and weight than comparable fittings without a sacrifice of strength.

These and other objects will be readily apparent from an inspection of the accompanying drawings in which.

Figure 1:
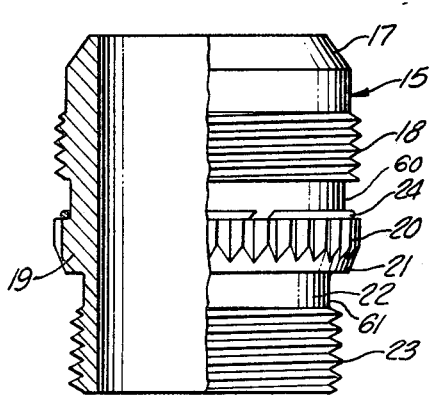
FIG. 1 is an elevational, partly sectioned view of the body of the fluid fitting embodying the principles of the invention.
Figure 2:
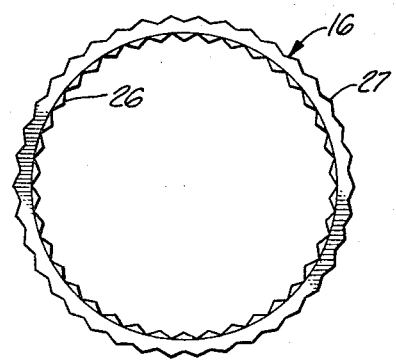
FIG. 2 is a bottom plan view of the lock ring used in conjunction with the fitting of FIG. 1.
Figure 3:
FIG. 3 is an elevational, partly sectioned view of the ring shown in FIG. 2.

The invention includes two basic elements, a hollow cylindrical body generally indicated as 15 in FIG. 1, and a cooperating lock ring 16 in FIGS. 2 and 3. The body 15 has tapered upper portion 17 and an externally threaded portion 18 to provide means for tightening a conventional hose or line coupling, not shown, against body 15. Beneath the threaded portion 18 is a reduced portion 60 and an annular flange 19, having a plurality of uniformly spaced serrations 20 about its periphery. Below the flange 19 the diameter of the body is decreased so as to provide a reduced portion 61 and so that an annular sealing shoulder 21 is defined for a purpose to be hereinafter described in greater detail. The lower portion 22 of the body 15 is provided with a plurality of external threads 23 to which a suitable screw type fitting may be secured, or which may be threaded into an accommodating workpiece.

Annularly disposed about the reduced portion 60 of body 15 above flange 19, is a split snap ring 24. Snap ring 24 is adapted to be partially accommodated in internal annular groove 25 carried by lock ring 16 to provide a means for temporarily securing said lock ring 16 to body 15 prior to the installation operation, as will hereinafter be more fully described.

Lock ring 16, as illustrated in FIGS. 2 and 3, is provided with internal and external serrations 26 and 27, respectively. Said lock ring is also provided with an internal annular groove 25 which intersects the crests of internal serrations 26 and is adapted to accommodate split snap ring 24. When lock ring 16 is assembled with body 15, internal serrations 26 are in engagement with flange serrations 20.

Figure 4:
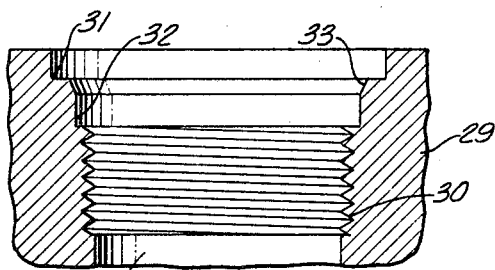
FIG. 4 is a sectional view of the specially counterbored bore in the workpiece adapted to receive the fluid fitting of this invention.
Figure 5:
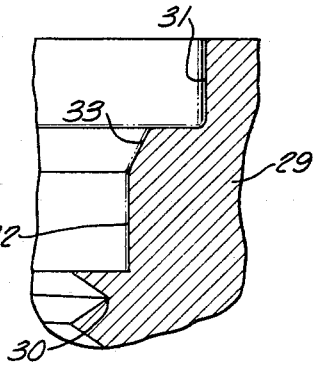
FIG. 5 is a greatly enlarged fragmentary view, in section, showing details of the counterbore illustrated in FIG. 4.
Figure 6:
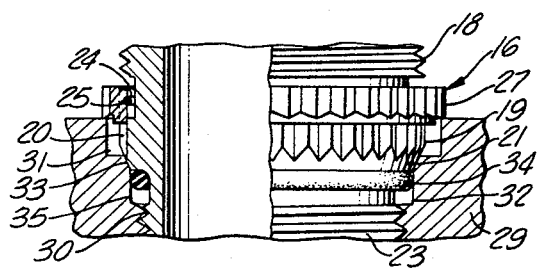
FIG. 6 is a fragmentary schematic side view, partly in section, showing the fitting accommodated in the corresponding workpiece bore, illustrating the locking ring in a preinstalled position.
Figure 7:
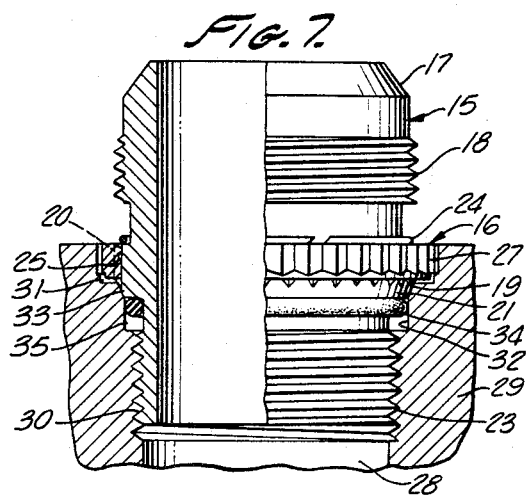
FIG. 7 is a view similar to FIG. 6, but showing the lock ring axially displaced into its locked position in the workpiece.
Figure 8:
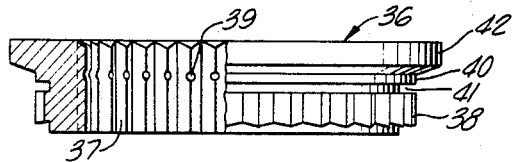
FIG. 8 is an elevational sectional side view of an alternate embodiment of the lock ring utilized with the fitting of this invention.
Figure 9:
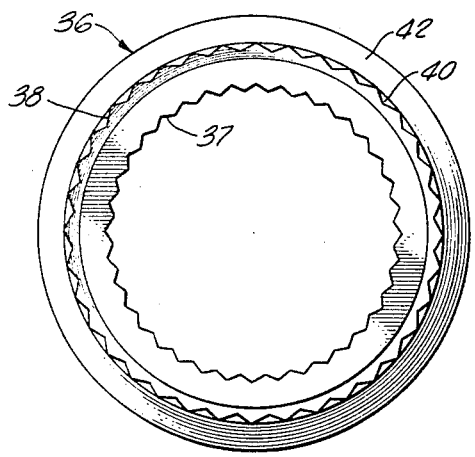
FIG. 9 is a bottom plan view of the alternate lock ring embodiment shown in FIG. 8.
Figure 10:
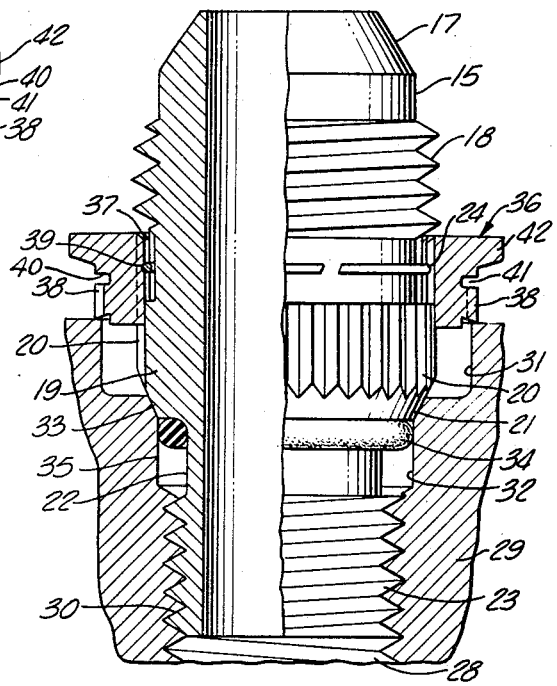
FIG. 10 is an elevational side view, partly in section, showing the fitting accommodated in the workpiece bore and the alternate embodiment of the lock ring of FIG. 8 in preinstallation position.

The fitting of the instant invention is installed by screwing it into a threaded bore 28 formed in workpiece material 29, such as that shown in FIG. 4 (see also FIGS. 5, 6 and 7). The workpiece bore 28 is provided with threads 30 and a pair of flat bottomed counterbores 31 and 32 longitudinally separated by an annular beveled surface 33.

Prior to installation of the fitting, the split snap ring 24 is first placed tightly around the reduced portion 60 of body 15 above flange 19. The lower portion 22 of body 15 is then inserted through lock ring 16 until snap ring 24 is engaged by the internal annular groove 25 provided by the crests of the internal serrations 26 of the lock ring. It will be noted that the internal serrations 26 are in constant engagement with serrations 20 provided by flange 19. Due to the accommodation of the snap ring 24 in annular groove 25, lock ring 16 is maintained in temporary rigid association with body 15 of the fitting so as to prohibit displacement of lock ring 16 in a longitudinal direction relative to the body 15.

Also, before body 15 is threaded into the workpiece material 29 an O-ring is placed around the reduced portion 61 of lower portion 22 of body 15, adjacent the lower surface of flange 19. During the threading of the body 15 into its fully seated position, O-ring 34 is compressed between the body 15 and the wall 35 of counterbore 32 so as to form a "back-up" seal to the seal formed between shoulder 21 and beveled surface 33. The O-ring type of seal is a standard commercially available product having a resilient inner spring surrounded by a soft metallic or nonmetallic sealing material, so that when the ring is in place it may be compressed to fill the interstices and effect a positive seal between the element about which it is placed under tension and the element which externally constrains it.

Body 15, together with the lock ring 16 temporarily secured thereto, is threaded into bore 28 until sealing shoulder 21 is in tight association with annular beveled surface 33 of said bore 28 thereby forming a metal to metal seal (see FIG. 6). As aforesaid, O-ring 34 is simultaneously compressed between the body 15 of wall 35 of counterbore 32 so as to provide a reinforcing seal to that provided between shoulder 21 and beveled surface 33. After sealing shoulder 21 of body 15 is in tight association with the beveled surface 33, an axial force is applied to the top of lock ring 16 thereby longitudinally displacing said ring downwardly so as to embed the external serrations 27 thereof into the workpiece 29. Lock ring 16, being in its fully locked position, is prevented from subsequent rotational movement and concomitantly preventing rotational displacement of body 15.

As lock ring 16 is being axially displaced, snap ring 24 comes into contact with the top portion of serrations 20 carried by flange 19 so as to be restricted from further downward movement, thereby dislodging lock ring 16 from association with snap ring 24. Thus, while lock ring 16 is being embedded into workpiece 29, it is disengaged from snap ring 24 which remains tightly positioned about the reduced portion 60 of body 15 above flange 19 (see FIG. 7). Snap ring 24 may then be removed from body 15 and utilized in the installation of another fitting.

Lock ring 36, illustrated in FIGS. 8 through 11, is provided with internal serrations 37 and external serrations 38 and an internal annular groove 39. However, lock ring 36 is further provided with an annular abutment shoulder 40 which is longitudinally spaced from the top of said serrations by channel 41. In addition, lock ring 36 is provided with a radial flange 42 which has a diameter greater than the diameter of the counterbore 31 (see FIG. 10) and is in spaced relationship relative to abutment shoulder 40. Lock ring 36 is used in conjunction with body 15 in the same manner as is lock ring 16. Further, the workpiece bore 28 which is used in conjunction with lock ring 16 and body 15 may also be utilized with lock ring 36. The installation of a fitting provided with lock ring 36 is in all cases similar to installing the fitting using lock ring 16, except that the downward displacement of lock ring 36 is curtailed when abutment shoulder 40 provided by lock ring 36 comes into contact with the surface of the workpiece.

In addition, since radial flange 42 is longitudinally spaced from the abutment shoulder 40, upon the contact of said abutment shoulder with the surface of the workpiece, radial flange 42 is also in longitudinal spaced relationship with said workpiece surface. Thus, with the insertion of the proper tool between the surface of the workpiece and radial flange 42, lock ring 36 may be pried loose from its engagement with the workpiece and thereafter removed.

Figure 12:
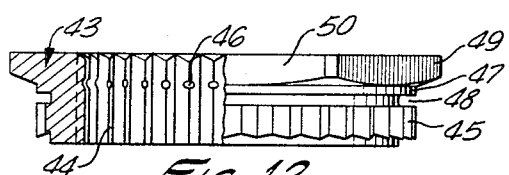
FIG. 12 is a side elevational view, partly in section, of another embodiment of the lock ring utilized with the fitting of this invention.
Figure 13:
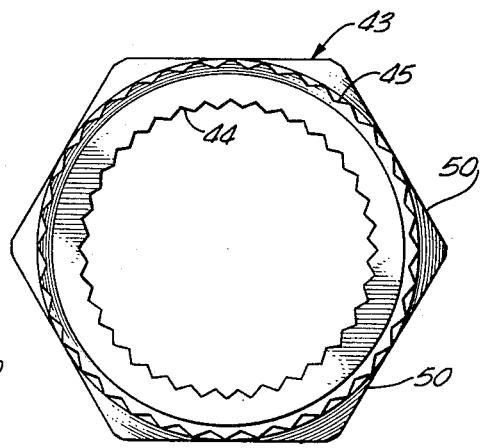
FIG. 13 is a bottom plan view of the lock ring shown in FIG. 12.
Figure 11:
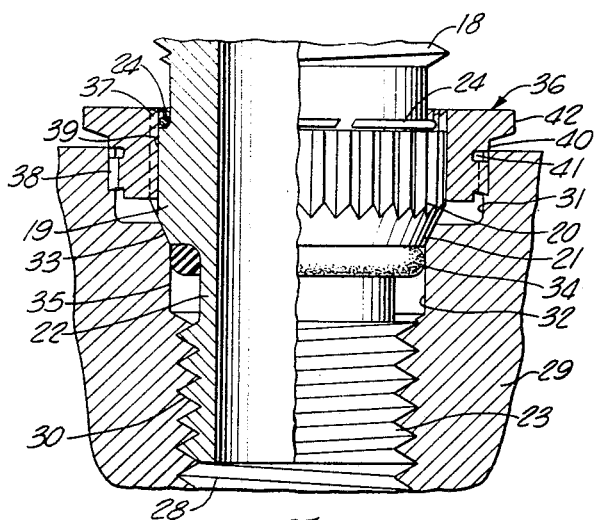
FIG. 11 is an elevational side view, partially in section, showing the fitting of FIG. 10 with the alternate embodiment of the lock ring axially displaced into its locked position in the workpiece.

FIGS. 12 and 13 illustrate an alternate configuration of a lock ring capable of being used with body 15 of the instant invention wherein lock ring 43 is provided with internal and external serrations 44 and 45, respectively. Lock ring 43 is also provided with internal annular groove 46, which intersects the crests of internal serrations 44 and is adapted to engage snap ring 24, annular abutment shoulder 47 and channel 48. The features of lock ring 43 are essentially similar to those of lock ring 36 except that the radial flange 49 is provided with an intermittently flattened edge 50 (i.e., such as a hexagon) to provide a means for wrenching the lock ring (and concomitantly body 15 tightly secured thereto) into the workpiece bore 28. Lock ring 43 in all other respects is utilized in the same manner as lock ring 36.

While several embodiments of the invention have been described, it is, of course, understood that the particular embodiments of the invention herein disclosed are for illustrative purposes only and that various changes may be made therein without departing from the principles of the invention or the scope of the annexed claims.

We claim:

1. A high pressure fluid fitting which comprises:
   a tubular stud, said stud being provided with a radially outwardly extending flange, said flange having serrations around the periphery thereof, said stud being provided with first and second annular grooves, one of each of said grooves being positioned on opposite sides of said flange, external threads provided on said stud on opposite sides of said flange, the exterior of one extremity of said stud being radially inwardly tapered;
   sealing means accommodated in the said second annular groove provided by said stud, said second annular groove being adjacent and below said flange, said sealing means being in tight sealing association with said second annular groove upon the threading of said fitting into a workpiece;
   an internally and externally serrated lock ring, the internal serrations of said lock ring being engageable with the serrations of said stud flange, said external serrations beinng adapted to be embedded in the surface of the workpiece upon application of an axial force thereon thereby preventing rotational movement of said stud relative to said workpiece, an internal annular groove interstcting the crests of the internal serrations of said lock ring; and
   means disposed in the internal annular groove of said lock ring and in said first groove for temporarily rigidly securing said lock ring to said stud prior to the axial displacement of said lock ring into the workpiece, said means being displaced from said internal annular groove of said lock ring and out of contact with said lock ring, but remaining in said first groove, by intermittent shoulders formed by the ends of the flange serrations upon axial displacement of said lock ring relative to said stud into said workpiece.

2. A high pressure fluid fitting as described in claim 1, wherein a portion of the face of the stud flange is beveled and the remaining portion of said face is defined by a plurality of longitudinal serrations and wherein the sealing means is comprised of an O-ring seal.

3. A high pressure fluid fitting as described in claim 1, wherein the temporary securing means is comprised of a split ring annularly disposed about said stud in said first annular groove and accommodated in said internal groove of said lock ring for rigidly temporarily securing the same to said stud prior to the axial displacement of said lock ring into the workpiece.

4. A high pressure fluid fitting as described in claim 2, wherein the temporary securing means is comprised of a split ring annularly disposed about said stud in said first annular groove and accommodated in said internal groove of said lock ring for rigidly temporarily securing the same to said stud prior to the axial displacement of said lock ring into the workpiece.

5. A high pressure fluid fitting as described in claim 4, wherein said lock ring is provided with an annular abutment shoulder for limiting the axial displacement of the lock ring longitudinally spaced from said external serrations by an annular groove therebetween and an annular flange adjacent said abutment shoulder for providing means for removing said lock ring.

6. A high pressure fluid fitting which comprises:
a tubular stud, said stud being provided with an external radially outwardly projecting flange, a portion of the peripheral face of said flange being beveled, the remaining peripheral face of said flange being provided with a plurality of external longitudinal serrations, said stud being provided with an external thread on the stud body on opposite sides of said flange, a first annular groove and a second annular groove situated on opposite sides of said flange, an O-ring seal accommodated in said second annular groove, said second annular groove being adjacent and below said flange, said sealing means being in tight sealing association with said second annular groove upon the threading of said fitting into a workpiece;
a lock ring, said lock ring having internal serrations, said serrations being engaged with the external flange serrations of said stud, said lock ring being provided with external peripheral serrations, said serrations being adapted to embed in the surface of the workpiece upon the application of an axial force thereon thereby preventing rotational movement of said stud relative to said workpiece, an internal annular groove intersecting the crests of the internal serrations of said lock ring;
means accommodated in the internal annular groove of said lock ring and in said first groove for temporarily rigidly securing said lock ring to said stud prior to the axial displacement of said lock ring into the workpiece; and
intermittent radial shoulders formed by the ends of the flange serrations for dislodging said means from said internal annular groove of said lock ring and out of contact therewith during the axial displacement of said lock ring, said means remaining in said first groove.

7. In combination, a workpiece having a threaded bore with a first flat-bottom counterbore at its upper end and including an upwardly and outwardly inclined bottom wall and a second flat-bottom counterbore longitudinally spaced from said first counterbore by said inclined bottom wall and an insert, comprising:
a tubular stud having external threads engaged with the threads of said bore, a first annular groove and a second annular groove provided by said stud, said second annular groove positioned in said second counterbore of said bore after fully threading said stud into said bore;
an integral flange positioned between said first and second annular grooves and projecting radially outwardly from said stud, said flange having a portion of the peripheral face thereof beveled and the remaining portion of said peripheral face provided with longitudinal serrations, said beveled portion of said flange face being seated in tight engagement with said inclined bottom wall of said bore, said flange being adjacent and above said second annular groove;
an externally and internally serrated lock ring received in said first counterbore, said internal serrations being provided with an annular groove intersecting the crests thereof and being engaged with the external serrations of said stud flange, said external serrations of said lock ring being pressed into the workpiece adjacent said first counterbore so as to prevent rotational movement of said stud relative to said workpiece; sealing means positioned between the wall of said second flat-bottomed counterbore and said second annular groove of the stud body, said sealing means being in simultaneous tight sealing association with said second flat-bottom counterbore and said second annular groove; and,
means disposed about said stud in said first groove and in the internal annular groove of said lock ring for temporarily securing said lock ring to said stud prior to axial displacement of the lock ring into the workpiece, said means being displaced from said internal annular groove of said lock ring and out of contact with said lock ring, but so as to remain in said first groove, by intermittent shoulders formed by the ends of the flange serrations upon axial displacement of said lock ring relative to said stud into said workpiece.

8. The combination as defined in claim 7, wherein said sealing means is comprised of an annular O-ring seal.

9. The combination as defined in claim 8, wherein the temporary securing means is comprised of a split ring originally accommodated in said internal groove of said lock ring prior to the axial displacement of said lock ring into the workpiece.

References Cited
UNITED STATES PATENTS

| | | | |
|---|---|---|---|
| 2,172,350 | 9/1939 | Heyner et al. | 151—41.73 |
| 2,330,864 | 11/1943 | Bruno | 285—351 X |
| 2,782,827 | 2/1957 | Rosan | 151—41.73 |
| 2,801,891 | 8/1957 | De Lorean | 29—450 |
| 2,907,589 | 11/1959 | Knox | 285—355 X |
| 3,212,796 | 11/1965 | Neuschotz | 285—158 X |
| 3,215,183 | 11/1965 | Dietlein | 51—41.73 |
| 3,245,701 | 4/1966 | Leopold et al. | 285—355 |
| 3,259,162 | 7/1966 | Rosan | 285—92 X |
| 3,259,163 | 7/1966 | Rosan et al. | 285—92 X |

EDWARD C. ALLEN, *Primary Examiner.*

DAVE W. AROLA, *Assistant Examiner.*